United States Patent [19]

Aho

[11] 4,354,325
[45] Oct. 19, 1982

[54] FOLDING MARINE TRAP

[75] Inventor: Sakari Aho, Port Coquitlam, Canada

[73] Assignee: SAK Industries (1980) Ltd., Port Coquitlam, Canada

[21] Appl. No.: 292,152

[22] Filed: Aug. 12, 1981

Related U.S. Application Data

[63] Continuation of Ser. No. 108,656, Dec. 31, 1979, abandoned.

[51] Int. Cl.$^3$ .............................................. A01K 69/10
[52] U.S. Cl. ...................................................... 43/105
[58] Field of Search .................... 43/55, 56, 100, 105; 108/118, 120; 119/3, 15; 135/4 R; 150/49; 248/164; 297/18, 56

[56] References Cited

U.S. PATENT DOCUMENTS

| | | | |
|---|---|---|---|
| 334,674 | 1/1886 | Neal | 150/49 |
| 1,007,829 | 11/1911 | Westbrook | 135/4 R |
| 3,029,546 | 4/1962 | Ruiz | 43/105 |
| 3,152,833 | 10/1964 | Creveling et al. | 108/118 |
| 3,209,484 | 10/1965 | Beamer | 43/100 |
| 3,786,593 | 1/1974 | Gerbrandt | 43/100 |
| 3,893,648 | 7/1975 | Gilbert | 248/164 |

FOREIGN PATENT DOCUMENTS

| | | | |
|---|---|---|---|
| 459749 | 9/1949 | Canada | 43/105 |
| 971751 | 7/1975 | Canada . | |
| 114165 | 10/1900 | Fed. Rep. of Germany | 43/105 |
| 506369 | 5/1920 | France | 108/118 |
| 215559 | 5/1924 | United Kingdom | 297/18 |
| 602151 | 5/1948 | United Kingdom | 108/118 |

Primary Examiner—Stephen G. Kunin
Assistant Examiner—K. Bradford Adolphson
Attorney, Agent, or Firm—Carver & Co.

[57] ABSTRACT

Folding trap having folding frame fitted within net resembling a bag, the net having an opening which permits creature to enter trap and hinders leaving the trap. Frame members are hinged together adjacent mid positions thereof to permit swinging between folded and erected positions. Resilient extension links extend between frame members and are strained when frame is folded so as to tend to erect trap. Releasable retainer retains trap in folded position against force from extension means, and limiter limits swinging of frame members in erected position.

13 Claims, 5 Drawing Figures

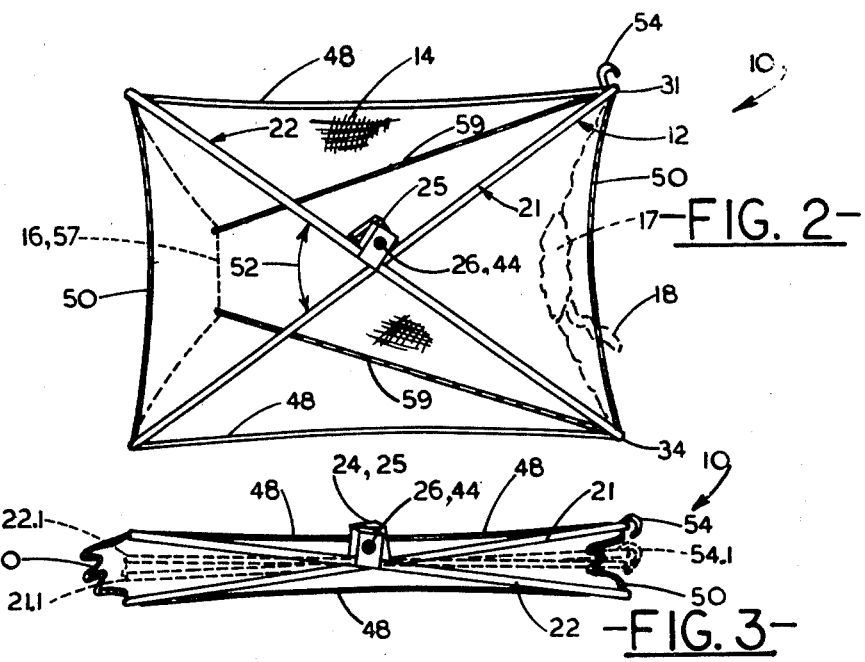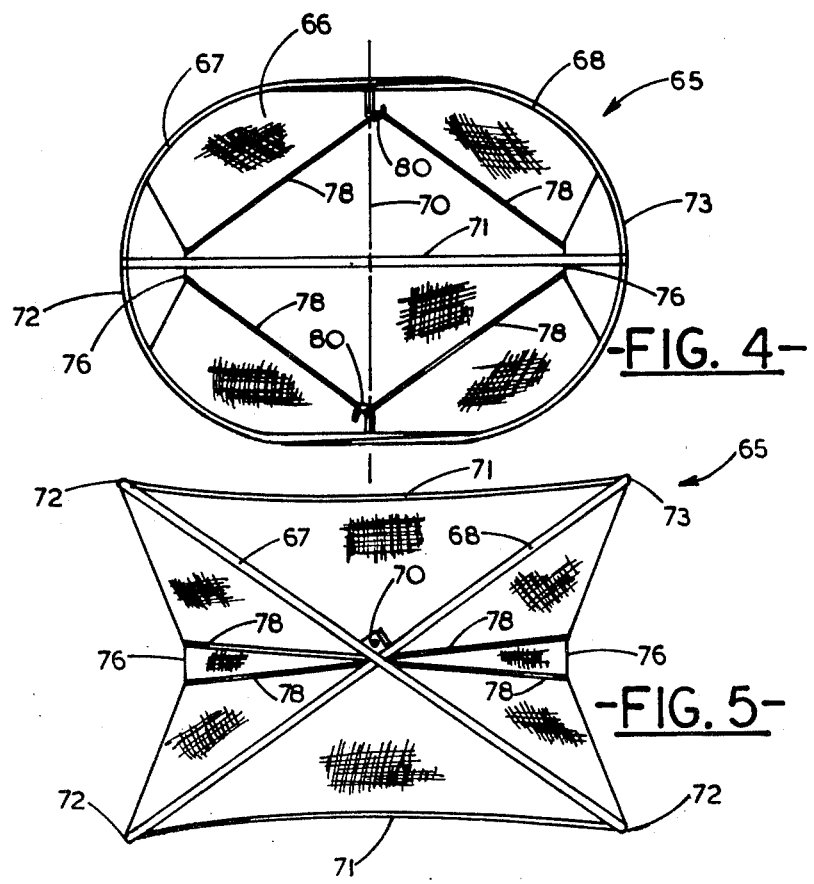

FOLDING MARINE TRAP

This is a continuation of application Ser. No. 108,656, filed Dec. 31, 1979, now abandoned.

BACKGROUND OF THE INVENTION

1. Field of the Invention

The invention relates to a folding trap, in particular a trap for trapping marine creatures, such as crabs, lobsters, relatively large fish, etc.

2. Prior Art

Marine creature traps have been used for a long time and early traps were commonly a rigid space frame structure having enclosing walls of a net- or grid-like material with an opening therein which permitted a creature to enter the trap and to hinder the creature from leaving the trap. Whilst such traps have been satisfactory in many applications, when used in large quantities on commercial fishing vessels, storage of the rigid traps becomes a problem.

To reduce storage problems of rigid traps, folding traps have been devised, one such trap being shown in Canadian Pat. No. 971,751 issued on July 29, 1975 to George Gerbrandt. This patent discloses a plurality of U-shaped frame portions hinged to a central boss so that when the frame portions are extended, a generally rectangular space enclosed by the net is formed. The smaller sizes of this trap are relatively easy to erect manually, but the larger sizes, for example up to 3 meters in length, present difficulty when erecting the trap manually, particularly in the restricted space commonly found on a commercial fishing vessel. Also, manual erection of folding traps is made more difficult on a pitching vessel in heavy seas, particularly when the traps are coated with seaweed, algae, etc. from a previous immersion.

Also, when folded, because this type of trap is not symmetrical, it tends to assume a shallow wedge-like shape. Unless particular care is taken when stacking the folded traps of this type, the stacks of folded traps can become unstable and topple onto the deck, or into the sea, sometimes resulting in loss of the traps.

SUMMARY OF THE INVENTION

The invention reduces difficulties and disadvantages of the prior art by providing a folding trap which, when folded, assumes a generally flat symmetrical shape so as to facilitate stacking of folded traps one on top of the other. Furthermore, the invention provides an automatically opening trap in which retaining means of the trap can be released prior to immersion, and manual erection of the trap is eliminated completely.

A folding trap according to the invention is characterized by a folding frame and a net. The frame is fitted within the net and is adapted to be erected to support the net to form an enclosure therewith. The net resembles a bag and has an opening to permit a creature to enter the trap and to hinder leaving the trap. The trap is further characterized by first and second frame members, elastic extension means, limiting means and releasable retaining means. The frame members are hinged together to permit swinging therebetween so as to permit erection of the frame from a folded position to an erected position. The extension means is adapted to extend between the frame members and has a length so as to be strained when extending between the frame members and the frame is in the folded position so that force from the strained extension means tends to unfold the trap from the folded position to the erected position. The limiting means cooperate with the frame members to limit additional movement of the frame members from the erected position that might otherwise occur due to force from the extension means. The releasable means cooperate with the trap to permit the trap to the folded.

A detailed disclosure following, related to drawings, describes preferred embodiments of the invention which, however, is capable of expression in structure other than that particularly described and illustrated.

DESCRIPTION OF THE DRAWINGS

FIG. 2 is a simplified side elevation of the erected trap of FIG. 1, FIG. 3 is a simplified side elevation of the trap of FIG. 1 shown partially folded in full outline, and completely folded in broken outline, FIG. 4 is a simplified top plan of an alternative trap in an erected position, and FIG. 5 is a simplified side elevation of the alternative trap of FIG. 4.

DETAILED DISCLOSURE

FIGS. 1 through 3

Figure 1:
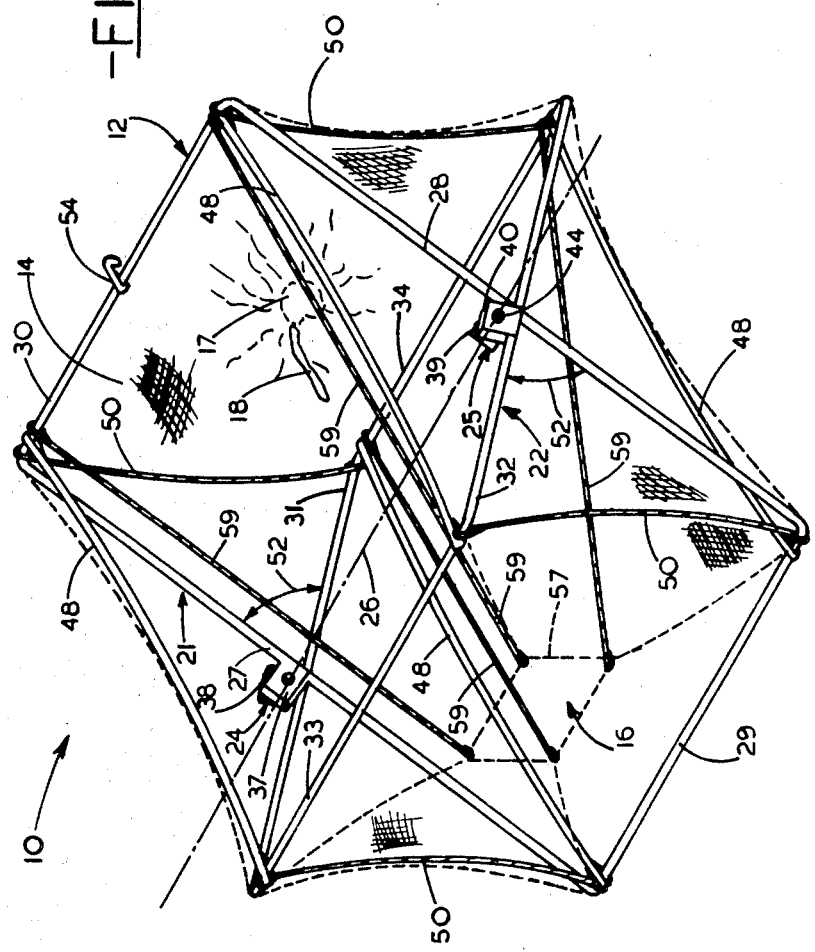
FIG. 1 is a simplified perspective of a trap according to the invention in an erected position ready for use.

A folding marine creature trap 10 according to the invention has a folding frame 12 and a net 14, some portions of the net being shown in broken line only. The frame is fitted within the net and is adapted to be erected to support the net and to form an enclosure therewith. The net 14 resembles a bag and has a an entranceway including first opening 16 to permit a creature to enter the trap and to hinder the creature from leaving the trap. The bag has a second opening 17 at an opposite end from the first opening, the second opening having a drawstring 18 to close the opening 17 when the trap is in use, and to permit easy opening thereof for withdrawal of a trapped creature from within the trap.

The folding frame has first and second frame members 21 and 22 which are hinged together adjacent approximate mid portions thereof at aligned hinges 24 and 25 so as to permit swinging therebetween about a hinge axis 26 extending transversely across the trap. The frame members are closed, generally rectangular in shape and of generally equal sizes, and can swing between an erected position, as shown in FIG. 1, and a folded position, as shown in broken outline in FIG. 3. The frame 21 has spaced elongated parallel side portions 27 and 28 disposed generally normally to and connected to spaced end portions 29 and 30. The frame member 22 similarly has parallel side portions 31 and 32 connected to end portions 33 and 34. The hinges 24 and 25 are located at approximate mid positions of the side portions 27 and 31, and 28 and 32 respectively, as shown. Generous radii extend between adjacent portions to reduce stresses on the net and tendency of tearing of corners of the net.

The hinge 24 includes hinge brackets 37 and 38 extending from the side portions 27 and 31 respectively, and the hinge 25 includes hinge brackets 39 and 40 extending from the side portions 28 and 32 respectively. The four brackets each have an undesignated opening which is aligned with the hinge axis 26, and the adjacent pairs of brackets 37 and 38, and 39 and 40, of each hinge receive hinge pins 43 and 44 respectively therein. It can be seen that the side portions 27 and 28 of the first frame adjacent the mid positions thereof are spaced slightly closer together than the side portions 31 and 32 of the second frame adjacent the mid positions. This spacing different permits the side portions of the first frame to fit in between the side portions of the second frame to permit essentially unrestricted swinging of the side frames about the hinge axis 26.

Four elastomeric strips 48 extend from positions adjacent each of the four corners of the frames, and each has a length such that the strips tend to draw spaced end portions of the frame members towards each other from the folded position. The frames swing about the hinge axis 26 to the erected position at which point further swinging is limited as will be described. At this position, the strips 48 are sufficiently taut when the frame is extended to provide longitudinal supporting corners for portions of the net extending between adjacent end portions and side portions of the frame. The elastomeric strips are resistant to sea water deterioration and are suitably about 1 to 2 cm. wide and between 1 and 2 mm. thick. Four relatively inelastic corner cords 50 extend between opposite corners of the frames in a manner opposite to that of the elastomeric strips as shown, ie. at right angles to the strips 48. The cords 50 each have a length which limits swinging of the frame members at the erected position so that the net assumes a generally elongated parallelopiped prism shape as shown in FIG. 1. Whilst theoretically only one cord is required to limit swinging of the frames, in practice four cords, one at each corner, provide relatively rigid corners for the net to pass around from adjacent sides of the trap when extended.

When the frame is erected, as shown in FIGS. 1 and 2, the first and second frame members 21 and 22 are inclined to each other at an angle 52 which can be adjusted by adjustment of the length of the cords 50. The angle 52 is preferably within the range of between 30 and 45 degrees, although clearly a wide range of angles is possible. The angle is selected so that the four elastomeric strips 48 and the cords 50 are sufficiently taut when the frame is erected so as to provide corners for supporting the net. It can be appreciated that when the frame is folded, as seen in FIG. 3, the angle 52 decreases to approach zero, and lengths of the elastomeric strips 48 increase further straining the strips, whilst the cords 50 simply become slack and are folded loosely between the frame members.

Thus it can be seen that the elastomeric strips 48 serve as elastic extension means extending between, i.e. cooperating with, the frame members and are strained when the frame is in the folded position so as to tend to unfold the trap from the folded position to the erected position. Also, the cords 48 thus serve as limiting means cooperating with the frame members to limit additional movement of the frame members from the erected position that might otherwise occur due to force from the extension means.

A U-shaped latch means 54 is hinged to the end portion 30 of the frame 21 and is adapted to engage the adjacent end portion 34 of the second frame member 22 when the trap is folded, as shown in broken outline at 54.1 in FIG. 3. In FIG. 3, the latch 54 extends between the end portions 30 and 34 essentially to prevent movement between the frame members, shown in broken outline at 21.1 and 22.1. Thus the trap is held closed by a releasable retaining means, eg. the latch means 54, which cooperates with the trap to retain the trap in the folded position against force from the fully extended elastomeric strips 48 which are strained so as to tend to force the trap to the erected position upon release of the latch means.

Referring again to FIG. 1, the first opening 16 of the net has a generally rectangular periphery defined by a complementary peripheral cord 57, broken outline, extending therearound. The opening 16 has four corners which are retained in position by four corresponding guy lines 59 extending from the corners of the periphery of the opening to corresponding opposite corners of the trap. Preferably, the guy lines are elastic or at least have elastic portions to accomodate folding of the trap, and it can be seen that they can extend from the opening to corresponding opposite portions of the trap to holding the opening 16 open as shown.

OPERATION

In operation, the trap 10 is unfolded from the folded position, as shown in FIG. 3, by manually releasing the hinged latch means 54 and standing clear of the trap so that the trap can automatically extend until limited by one or more of the cords 50. The trap is now ready for operation and can be immersed in the water. With some of the larger traps, it might be easier to erect the trap immediately prior to its entering the water, that is, the latch means can be released as the trap is thrown overboard. Creatures caught in the trap can be withdrawn from the trap through the second opening 17 which, of course, is closed by the drawstring during normal operation of the trap. After use, the trap can be folded simply by pressing the opposite end portions of the frame towards each other, thus increasing stretch of the elastomeric strips 48, decreasing the angle 52 and bringing the end portions of the frame members together to permit latching by the latch means 54.

ALTERNATIVES AND EQUIVALENTS

The trap is shown with generally rectangular first and second frames, but alternative shapes can be selected, particularly an oval shape as shown in FIGS. 4 and 5. Preferably, the side portions of the frame members are parallel to each other to facilitate hinging which is shown at approximately mid positions of the side portions, although other locations of the hinges might be preferable in some circumstances. Also, the frames are closed, that is the member from which the frame is formed, suitably steel bar of 3 to 8 mm. diameter or equivalent, is an endless loop so as to secure rigidly together opposing side and end portions of the frame members. The structure shown is for crabs, lobsters, etc., and the frame members are about 0.5 m. by 1.0 m., but other marine creatures can be caught, such as relatively large fish, in which case the frame member can be 3 m. by 2 m. or larger depending on the species.

Relatively inelastic cords or steel strip with a length of elastomeric strip or coil spring therein could be substituted for the elastomeric strips 48. However, this may present difficulties relating to over extension and/or sea water corrosion. Whilst four elastomeric strips are shown, one would be sufficient provided it has sufficient strength, and alternative inelastic support cords at the corners of the frames could be substituted for the remaining elastomeric strips. However, the four elastomeric strips 48 provide redundancy and thus permit operation of the trap even when one or more of the strips have broken or have lost resilience. The strips 48 could extend between any portions of the two frame members which are adapted to swing towards each other upon erection of the frame, and thus are not limited to their particular position in the corners, as shown in FIGS. 1 through 3. Thus, other resilient flexible tension links can be substituted for the elastomeric strips.

As previously stated, one corner cord 50 would be sufficient to limit swinging of the frame members from the erected position. In some embodiments a correctly fitted net would, by itself, limit swinging of the frames and thus the cords 50 could be eliminated, and the net would serve as the limiting means. Thus the net has dimensions such that portions of the net limit additional relative movement of the frames from the erected position.

FIGS. 4 and 5

An alternative folding trap 65 has a net 66 and first and second frame members 67 and 68 hinged together at mid points of respective parallel side portions so as to hinge about a hinge axis 70. Each frame member has semi-circular end portions 72 and 73, as shown, and the trap has two elastomeric strips 71 extending between the end portions of opposite frame members. The net has openings 76 at opposite ends, which openings are defined by relatively stiff peripheries and are held open and in location by two endless resilient loops 78 which serve as guy lines and extend between the openings. The loops 78 pass through a pair of oppositely disposed hooks 80 extending inwardly from hinges at opposite sides of the trap and aligned with the hinge axis 70 to serve also as hinge pins. The net 66 is thus fitted so as to be held snugly against the spaced frame members when the frame is erected. The elastomeric strips 71 extend as required to accomodate swinging of the trap for closing, in a manner similar to the previous embodiment. This trap is of more rounded appearance and is more suitable in larger sizes for trapping the larger fish. Clearly only one opening 76 need be provided if desired, and the loop would then take an alternative position.

I claim:
1. A folding trap characterized by a folding frame and a net, the frame being fitted within the net and being adapted to be erected to support the net and to form an enclosure therewith, the net resembling a bag and having an entranceway including an opening to permit a creature to enter the trap and to hinder leaving the trap, the trap being characterized by:
    (a) first and second frame members hinged together to permit swinging therebetween so as to permit erection of the frame from a folded position to an erected position,
    (b) extension means connected to and adapted to cooperate with the frame members so as to be strained when the frame is in the folded position for providing a force from the strained extension means which forces the trap from the folded position to the erected position,
    (c) limiting means cooperating with the frame members to limit additional movement of the frame members from the erected position that might otherwise occur due to force from the extension means,
    (d) releasable means cooperating with the frame members to permit the trap to be folded,
    (e) support means for maintaining the entranceway in an operable position to permit entrance of creatures when the trap is in the erected position.
2. A trap as claimed in claim 1 further characterized by:
    (a) the frame members are closed frame members hinged together adjacent approximate mid positions thereof for swinging about a hinge axis.
3. A trap as claimed in claim 2 further characterized by:
    (a) the frame members are generally rectangular in shape and of generally equal sizes.
4. A trap as claimed in claim 1 in which the extension means is further characterized by:
    (a) resilient tension link means adapted to extend between portions of the two frame members which are adapted to swing towards each other upon erection of the frame, the extension means having a length so as to be strained when extending between the frame membes when the frame is in the folded position.
5. A trap as claimed in claim 3 further characterized by:
    (a) each frame member has two spaced elongated parallel side portions disposed generally normally to and connected to spaced end portions, the side portions of the first member being hinged to the adjacent side portions of the second frame member at the approximate mid positions thereof,
    (b) the extension means is resilient tension link means adapted to extend between opposite end portions of the frame members.
6. A trap as claimed in claim 5 further characterized by:
    (a) the side portions of the first frame member adjacent the mid positions thereof are spaced closer together than side portions of the second frame member adjacent the mid positions thereof, so that the side portions of the first frame member fit in between the side portions of the second frame member.
7. A trap as claimed in claim 5 further characterized by:
    (a) hinge brackets extending from adjacent the mid positions of each side portion of each frame member, the hinge brackets having aligned openings aligned with the hinge axis,
    (b) hinge pins to fit in the openings of each adjacent pair of hinge brackets.
8. A trap as claimed in claims 1, 2 or 4 further characterized by:
    (a) the releasable retaining means include a hinged latch means hinged to the first frame member and adapted to engage an adjacent portion of the second frame member when the trap is folded so as to essentially prevent movement between the frame members.
9. A trap as claimed in claims 1, 2 or 4 in which the support means is further characterized by:
    (a) guy lines extending from the opening to corresponding opposite portions of the trap tending to hold the opening open.
10. A trap as claimed in claim 9 further characterized by:
    (a) the guy lines having elastic portions to accomodate folding of the trap.
11. A trap as claimed in claim 5 further characterized by:

(a) the hinge pins including a pair of oppositely disposed hooks aligned with the hinge axis,
(b) an endless resilient loop passes through the hooks and extend between the opening in the net to serve as a guy line.

12. A trap as claimed in claims 1, 2 or 4 in which the limiting means cooperating with the frame members includes at least one relatively inelastic corner cord extending between opposite corners of the frame in a manner opposite to that of the extension means, the cord having a length which limits swinging of the frame members from the erected position.

13. A trap as claimed in claim 1, 2 or 4 in which the limiting means cooperating with the frame members is characterized by:
(a) the net having dimensions such that portions of the net limit additional relative movement of the frame members from the erected position.

* * * * *